(12) United States Patent
Kato (10) Patent No.: US 10,211,770 B2
(45) Date of Patent: Feb. 19, 2019

(54) MOTOR DRIVE CONTROL DEVICE AND CONTROL METHOD THEREOF

(71) Applicant: Minebea Mitsumi Inc., Nagano (JP)

(72) Inventor: Hiroyuki Kato, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/828,621

(22) Filed: Dec. 1, 2017

(65) Prior Publication Data
US 2018/0159456 A1 Jun. 7, 2018

(30) Foreign Application Priority Data

Dec. 6, 2016 (JP) ................................. 2016-237148

(51) Int. Cl.
| | |
|---|---|
| H02P 6/08 | (2016.01) |
| H02P 23/16 | (2016.01) |
| H02P 25/03 | (2016.01) |
| H02P 29/60 | (2016.01) |
| H02P 6/04 | (2016.01) |

(52) U.S. Cl.
CPC ............... *H02P 23/16* (2016.02); *H02P 6/04* (2013.01); *H02P 25/03* (2016.02); *H02P 29/60* (2016.02)

(58) Field of Classification Search
None
See application file for complete search history.

(56) References Cited

U.S. PATENT DOCUMENTS

| | | | | |
|---|---|---|---|---|
| 5,864,192 A | * | 1/1999 | Nagate ................... | H02K 29/08 310/156.05 |
| 2011/0254476 A1 | * | 10/2011 | Clothier .................. | H02P 6/085 318/400.1 |
| 2011/0254481 A1 | * | 10/2011 | Chen ...................... | H02P 29/028 318/400.13 |
| 2013/0026968 A1 | * | 1/2013 | Tagome ................ | H02M 7/797 318/724 |

FOREIGN PATENT DOCUMENTS

JP 2005-218261 A 8/2005

* cited by examiner

*Primary Examiner* — Bentsu Ro
(74) *Attorney, Agent, or Firm* — Pearne & Gordon LLP (57) ABSTRACT

There is provided a motor drive control device comprising: a temperature detection unit to detect a temperature of a motor; a rotational frequency detection unit to detect a rotational frequency of the motor based on an output of a rotational position sensor provided in the motor; a supply voltage detection unit to detect a supply voltage; a load calculation unit to calculate a magnitude of a load of the motor based on a detection result of the supply voltage detection unit; an advance angle instruction unit to set an advance angle instruction value based on a detection result of the temperature detection unit, a detection result of the rotational frequency detection unit and a calculation result of the load calculation unit; and a motor drive unit to supply a driving electric power to the motor based on a speed instruction value relevant to a rotational speed of the motor and the advance angle instruction value set by the advance angle instruction unit.

8 Claims, 10 Drawing Sheets

MOTOR DRIVE CONTROL DEVICE AND CONTROL METHOD THEREOF

CROSS REFERENCE TO RELATED APPLICATIONS

This application claims the benefit of Japanese Patent Application No. 2016-237148, filed Dec. 6, 2016, which is hereby incorporated by reference in its entirety.

BACKGROUND

Technical Field

The present disclosure relates to a motor drive control device and a control method of the motor drive control device, and particularly, relates to a motor drive control device to perform an advance angle adjustment and a control method of the motor drive control device.

Background

Conventionally, as a method for adjusting the phase angle of a motor, various methods have been proposed.

For example, in Japanese Patent Application Laid-Open No. 2005-218261, a configuration of a drive device for a motor to perform an advance angle adjustment based on information relevant to torque (specifically, a motor current flowing through an inverter circuit) and information relevant to rotational frequency is disclosed. It is described that the adjustment of the advance angle is greater as the information of the magnitude of the torque of the motor is greater and as the information of the magnitude of the rotational frequency is greater.

SUMMARY

Figure 10:
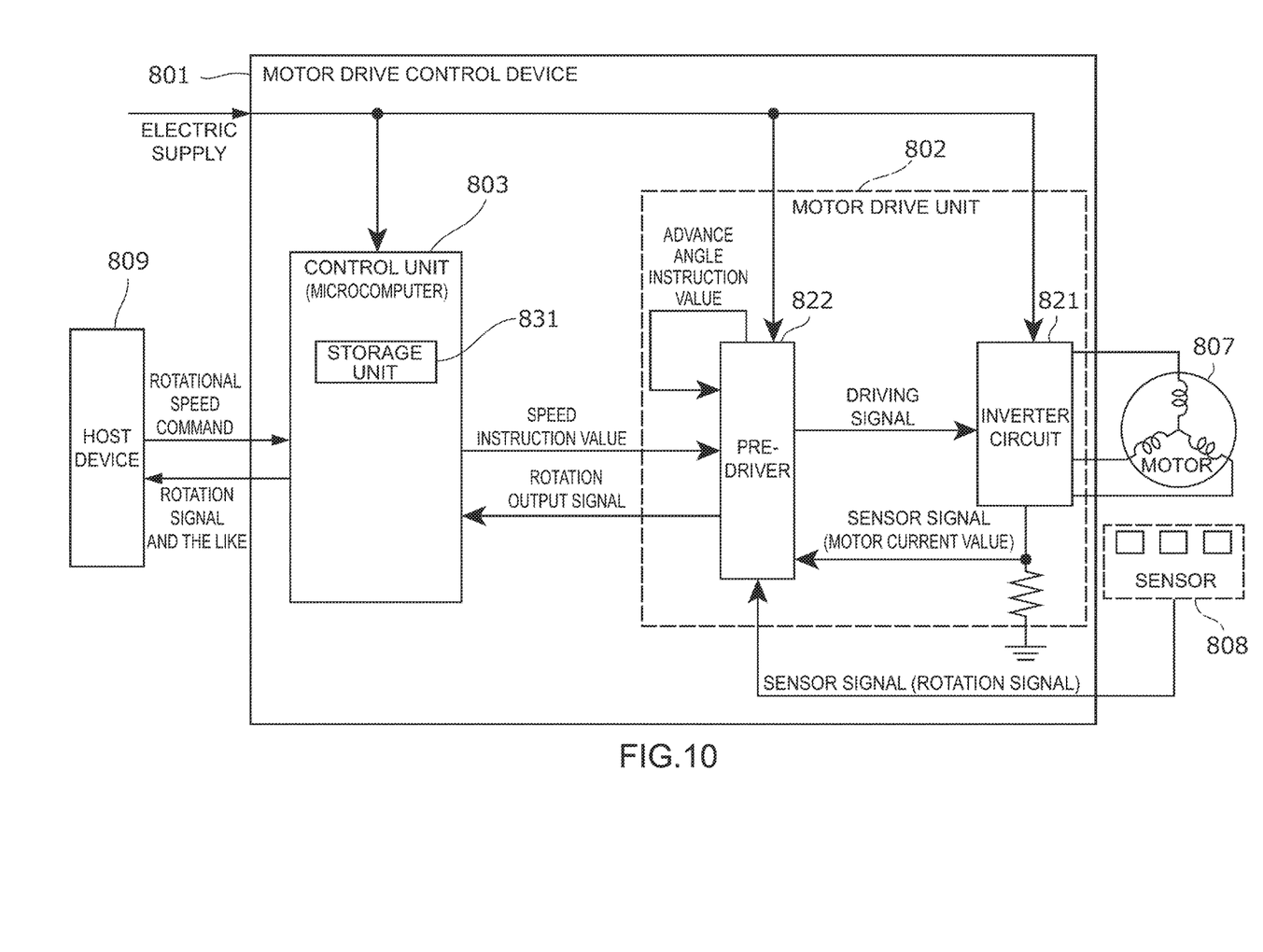
FIG. 10 is a diagram showing an example of a conventional motor drive control device.

FIG. 10 is a diagram showing an example of a conventional motor drive control device.

As shown in FIG. 10, a conventional motor drive control device 801 includes a motor drive unit 802 and a control unit 803. The motor drive control device 801 receives electric supply, and supplies a driving electric power to a motor 807 to drive the motor 807, based on a rotational speed command sent from a host device 809 and a sensor signal (rotation signal) output from a sensor 808 to detect the rotational position of the motor 807.

The motor drive unit 802 includes an inverter circuit 821 and a pre-driver 822.

The inverter circuit 821 outputs the driving electric power to the motor 807, based on a driving signal output from the pre-driver 822. Further, the inverter circuit 821 outputs an electric current value (motor current value) flowing through a coil of the motor 807, as a sensor signal, to the pre-driver 822.

To the pre-driver 822, the two sensor signals of the rotation signal and the motor current value, and a speed instruction value sent from the control unit 803 are input. The pre-driver 822 generates the driving signal for controlling the inverter circuit 821 based on the input signals, and outputs the driving signal to the inverter circuit 821. The pre-driver 822 sets an advance angle instruction value based on the input signals, and then generates and outputs the driving signal based on the set advance angle instruction value. Further, the pre-driver 822 generates a rotation output signal based on the sensor signal of the rotation signal, and outputs the rotation output signal to the control unit 803.

The control unit 803 is a microcomputer. The control unit 803 outputs the speed instruction value to the pre-driver 822 based on the rotational speed command, the rotation output signal and information stored in the storage unit 831.

By the way, when the range of an input voltage allowing the receiving of the electric supply can be widened in the above-described motor drive control device, the motor drive control device can be used for various use purposes, and is convenient. The range of the input voltage assumed herein is a wider range than a range in which the supply voltage can temporarily fluctuate. For example, when the motor drive control device can operate whether the voltage of an electric power to be supplied from a connected supply circuit is several tens of volts or a voltage higher than that voltage by several tens of volts, the motor drive control device can be used with various supply circuits, and is convenient.

However, when the operating voltage range of the motor is widened in this way, depending on the specification of a control IC to be used, the advance angle value changes in response to the supply voltage, and the efficiency decreases.

Further, in an environment with a rapid change in a temperature of the motor, the magnitude (amplitude) of an output signal of a sensor (for example, a Hall sensor) to detect the rotational position sometimes varies. When the temperature of the motor increases, the magnitude of the output signal of the sensor decreases, and sometimes it is not possible to properly detect the rotational position of the motor. When it is not possible to properly detect the rotational position of the motor, it is not possible to perform accurate drive control, and the motor potentially stops.

In view of the above-mentioned problems, the present disclosure is related to providing a motor drive control device and a control method of the motor drive control device that make it possible to perform an appropriate advance angle adjustment corresponding to the rotational frequency and the load in a wide operating voltage range even when the temperature of the motor changes.

In accordance with one aspect of the present disclosure, a motor drive control device includes: a temperature detection unit to detect a temperature of a motor; a rotational frequency detection unit to detect a rotational frequency of the motor based on an output of a rotational position sensor provided in the motor; a supply voltage detection unit to detect a supply voltage; a load calculation unit to calculate a magnitude of a load of the motor based on a detection result of the supply voltage detection unit; an advance angle instruction unit to set an advance angle instruction value based on a detection result of the temperature detection unit, a detection result of the rotational frequency detection unit and a calculation result of the load calculation unit; and a motor drive unit to supply a driving electric power to the motor based on a speed instruction value relevant to a rotational speed of the motor and the advance angle instruction value set by the advance angle instruction unit.

Preferably, the motor drive control device further includes an electric current detection unit to detect a magnitude of an electric current flowing through a coil of the motor, wherein the load calculation unit calculates the driving electric power of the motor based on the detection result of the supply voltage detection unit and a detection result of the electric current detection unit, and the advance angle instruction unit sets the advance angle instruction value based on the detection result of the temperature detection unit, the detection result of the rotational frequency detection unit and the driving electric power of the motor calculated by the load calculation unit.

Preferably, the load calculation unit calculates an estimated driving electric power of the motor based on the detection result of the supply voltage detection unit, the detection result of the rotational frequency detection unit and the speed instruction value, and the advance angle instruction unit sets the advance angle instruction value based on the detection result of the temperature detection unit, the detection result of the rotational frequency detection unit and the estimated driving electric power of the motor calculated by the load calculation unit.

Preferably, the load calculation unit calculates a multiplied value of a value of the supply voltage detected by the supply voltage detection unit by the speed instruction value, compares the multiplied value with the rotational frequency of the motor detected by the rotational frequency detection unit and thereby calculating the estimated driving electric power of the motor.

Preferably, the advance angle instruction unit sets the advance angle instruction value such that an advance angle increases in response to the rise of at least one of the temperatures of the motor to be detected by the temperature detection unit and the load of the motor to be calculated by the load calculation unit.

Preferably, the temperature detection unit detects an internal temperature of the motor based on a value output from a temperature sensor disposed inside of the motor, and the temperature sensor is disposed to output a value corresponding to a temperature of a vicinity of the rotational position sensor.

Preferably, the motor drive control device further includes a storage unit, wherein the storage unit stores base advance angle information previously set to correspond to the rotational frequency of the motor, first correction information previously set to correspond to the magnitude of the load of the motor, and second correction information previously set to correspond to the temperature of the motor, and the advance angle instruction unit determines a base advance angle value corresponding to the detection result of the rotational frequency detection unit based on the base advance angle information, determines a first advance angle adjustment value corresponding to the calculation result of the load calculation unit based on the first correction information, determines a second advance angle adjustment value corresponding to the detection result of the temperature detection unit based on the second correction information, and sets the advance angle instruction value based on the base advance angle value, the first advance angle adjustment value and the second advance angle adjustment value.

In accordance with another aspect of the present disclosure, a control method of a motor drive control device including a motor drive unit to supply a driving electric power to a motor based on an advance angle instruction value and a speed instruction value relevant to a rotational speed of the motor includes: a temperature detection step of detecting a temperature of the motor; a rotational frequency detection step of detecting a rotational frequency of the motor based on an output of a rotational position sensor provided in the motor; a supply voltage detection step of detecting a supply voltage; a load calculation step of calculating a magnitude of a load of the motor based on a detection result in the supply voltage detection step; and an advance angle instruction step of setting an advance angle instruction value based on a detection result in the temperature detection step, a detection result in the rotational frequency detection step and a calculation result in the load calculation step.

In accordance with the present disclosure, it is possible to provide a motor drive control device and a control method of the motor drive control device that make it possible to perform an appropriate advance angle adjustment corresponding to the rotational frequency and the load in a wide operating voltage range even when the temperature of the motor changes.

DETAILED DESCRIPTION

Hereinafter, an electronic device using a motor drive control device in one of the embodiments of the present disclosure will be described.

First Embodiment

Figure 1:
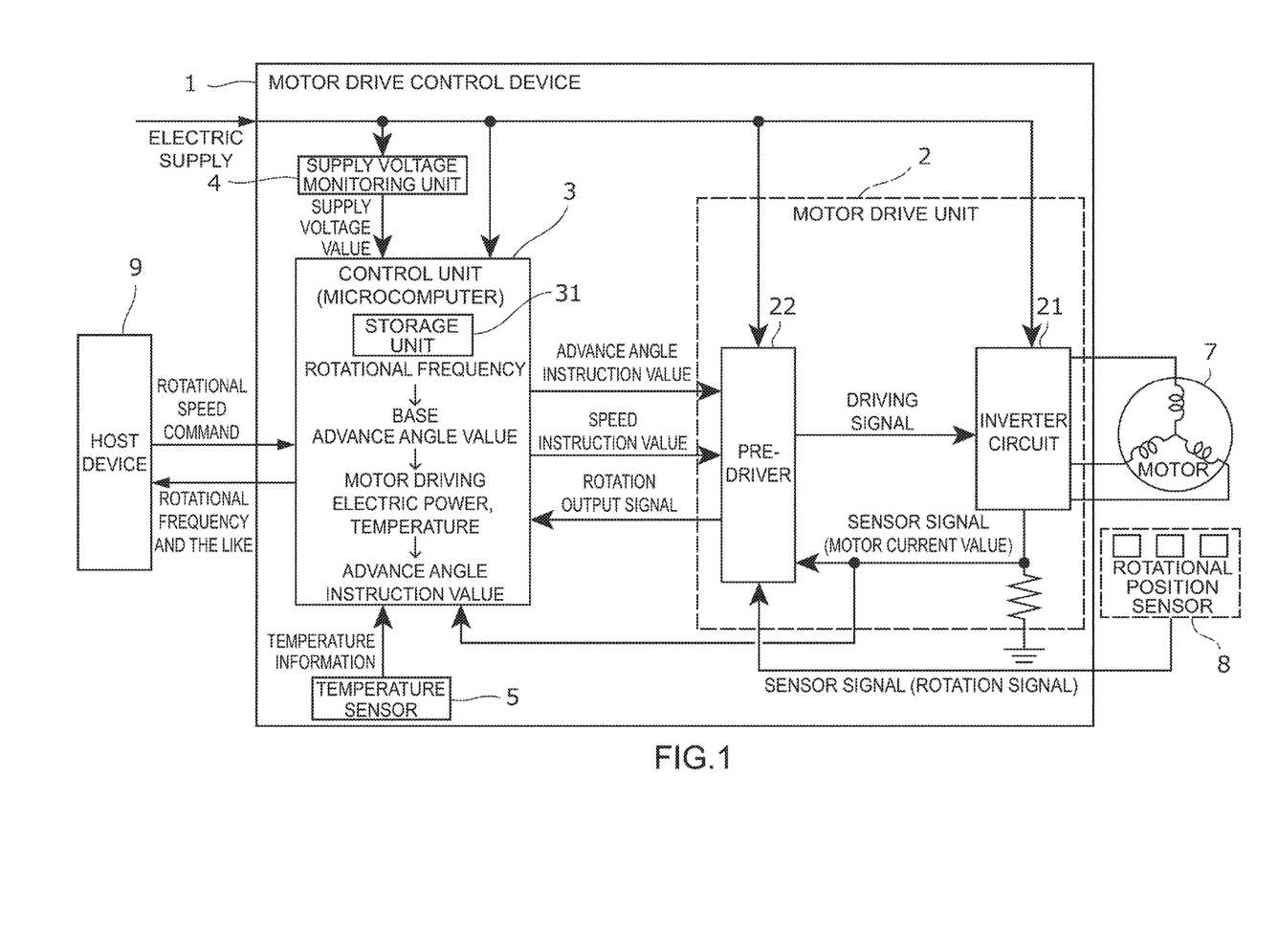
FIG. 1 is a block diagram showing an outline of a circuit configuration of a motor drive control device in a first embodiment of the present disclosure.

FIG. 1 is a block diagram showing an outline of a circuit configuration of a motor drive control device 1 in a first embodiment of the present disclosure.

As shown in FIG. 1, the motor drive control device 1 is configured to drive a brushless motor 7 (hereinafter, referred to as merely a motor 7), for example, by a 150-degree energization technique associated with an advance angle control. In the present embodiment, the motor 7 is a brushless motor having three phases, for example. The motor drive control device 1 supplies a driving electric power to the motor 7, and drives the motor 7. Specifically, for example, the motor drive control device 1 rotates the motor 7 by outputting a sinusoidal-wave driving signal to the motor 7 and periodically applying a driving electric current to an armature coil of the motor 7. The motor 7 is not limited to the brushless motor, and may be another motor. Further, the driving method for the motor 7 is not limited to the 150-degree energization technique, and may be another driving method.

The motor drive control device 1 includes a motor drive unit 2 and a control unit 3. To the motor drive control device 1, for example, a predetermined supply voltage is supplied.

The supply voltage is supplied to each of the motor drive unit 2 and the control unit 3. Here, the components shown in FIG. 1 are parts of the whole of the motor drive control device 1, and the motor drive control device 1 may include another component in addition to the components shown in FIG. 1.

The motor drive control device 1 drives the motor 7 based on a rotational speed command to be sent from a host device 9. For example, the host device 9 is an electronic device or the like equipped with the motor 7 and the motor drive control device 1. The motor drive control device 1 may be configured to drive the motor 7 using a predetermined rotational speed as a rotational speed command, without being based on a rotational speed command from another device. Further, the motor drive control device 1 may be configured to generate a rotational speed command for a rotational speed corresponding to a signal sent from the host device 9 or the like and to operate in accordance with the rotational speed command.

In the present embodiment, each of the motor drive unit 2 and the control unit 3 is an integrated circuit device (IC) and in the integrated circuit device circuits for realizing functions are integrated and packaged. The motor drive unit 2 and the control unit 3 may be packaged as a single integrated circuit device, or a whole or a part of the motor drive control device 1 may be packaged together with another device such that a single integrated circuit device is configured. The control unit 3 outputs a speed instruction value and an advance angle instruction value to the motor drive unit 2, and controls the operation of the motor drive unit 2.

The motor drive unit 2 includes an inverter circuit 21 and a pre-driver (pre-drive circuit) 22. The motor drive unit 2 supplies the driving electric power to the motor 7 based on the speed instruction value relevant to the rotational speed of the motor 7 and the advance angle instruction value. The speed instruction value and the advance angle instruction value are input from the control unit 3.

The inverter circuit 21 constitutes the motor drive unit 2 together with the pre-driver 22. The inverter circuit 21 outputs the driving electric power to the motor 7 based on the driving signal output from the pre-driver 22, and energizes the armature coil included in the motor 7. The inverter circuit 21 is configured, for example, such that a pair of series circuits for two switch elements provided at both ends of the supply voltage is disposed for each of the phases (U-phase, V-phase, W-phase) of the armature coil. In each pair of the two switch elements, a terminal for each phase of the motor 7 is connected with a connection point between the switch elements. In each phase, by changing the combination of on/off of the two switch elements, whether electric current is applied to the coil in the phase, and the direction of the electric current are changed.

The pre-driver 22 generates the driving signal for driving the inverter circuit 21 based on the control by the control unit 3, and outputs the driving signal to the inverter circuit 21. The pre-driver 22 generates the driving signal based on the speed instruction value and the advance angle instruction value output from the control unit 3. As the driving signal, for example, six kinds of signals corresponding to the switch elements of the inverter circuit 21 are output. When these driving signals are output, each of the switch elements corresponding to each driving signal performs the on/off operation, so that the driving signal is output to the motor 7 and electric power is supplied to each phase of the motor 7.

In the present embodiment, a rotation signal as a sensor signal output from a rotational position sensor 8 provided in the motor 7 and a motor current value as a sensor signal output from the inverter circuit 21 side are input to the pre-driver 22. Based on the rotation signal and the motor current value, the pre-driver 22 outputs the driving signal depending on the driving condition of the motor 7.

The motor current value is detected as a voltage value, by a resistor provided between the switch element of the inverter circuit 21 and the ground potential. In other words, the motor drive unit 2 functions as a sensor to detect the motor current value flowing through the coil of the motor 7.

For example, the rotational position sensor 8 is a Hall sensor (a Hall element, a Hall IC or the like). For example, three Hall sensors corresponding to the phases of the armature coil of the motor 7 are provided. That is, the rotational position sensor 8 outputs the rotation signal corresponding to the rotational position of a rotor of the motor 7. Based on the rotation signal, the pre-driver 22 outputs the driving signal corresponding to the rotational position of the rotor. The motor drive unit 2 may be configured to be used as a rotational position sensor to detect the rotational position of the rotor of the motor 7 by counter electromotive force, instead of the rotational position sensor 8.

In response to the input rotation signal, the pre-driver 22 outputs a rotation output signal corresponding to the rotational frequency of the motor 7, to the control unit 3. For example, the rotation output signal is an FG signal.

The control unit 3 outputs the speed instruction value and the advance angle instruction value to the motor drive unit 2, and controls the operation of the motor drive unit 2.

The rotational speed command output from the host device 9 is input to the control unit 3. Based on the rotational speed command, the control unit 3 outputs the speed instruction value to the pre-driver 22 of the motor drive unit 2. The rotational speed command is, for example, a PWM signal, and the control unit 3 outputs the speed instruction value based on the input rotational speed command. The form of the rotational speed command or the speed instruction value is not limited to this. Further, the control unit 3 may be configured to convert the input rotational speed command and output the speed instruction value. Here, for example, a start-stop signal, a brake signal, a rotational direction setting signal and the like are input from the host device 9 to the control unit 3, but the illustration of the signals is omitted.

[Description about Setting of Advance Angle Instruction Value]

In the present embodiment, the control unit 3 (more specifically, an advance angle instruction value output unit 39 described later) functions as an advance angle instruction unit to set the advance angle instruction value. The control unit 3 detects the internal temperature of the motor 7 and the load state of the motor 7, and, based thereon, determines an advance angle adjustment value. Then, based on the determined advance angle adjustment value and a base advance angle value to be determined by the rotational frequency, the control unit 3 sets the advance angle instruction value. The load state of the motor 7 is detected by calculating the driving electric power of the motor 7 based on the supply voltage of a power source to be supplied and the motor current to flow through the coil of the motor 7.

In the motor drive control device 1, a supply voltage monitoring unit 4 is included. The supply voltage monitoring unit 4 monitors the supply voltage to be supplied to the motor drive control device 1. The supply voltage monitoring unit 4 outputs the voltage value of the supply voltage obtained by the monitoring the supply voltage, to the control unit 3. Based on the input supply voltage value, the control unit 3 (more specifically, an analog signal conversion unit 32 described later) detects the supply voltage to be supplied to the motor drive control device 1.

Further, in the motor drive control device 1, a temperature sensor 5 to measure ambient temperature and output temperature information is included. For example, the temperature sensor 5 is disposed inside of the motor 7. The temperature information output from the temperature sensor 5 is input to the control unit 3. The control unit 3 (more specifically, the analog signal conversion unit 32 described later) functions as a temperature detection unit to detect the temperature of the motor 7. That is, the control unit 3 detects the internal temperature of the motor 7 based on the temperature information output from the temperature sensor 5.

Here, the temperature sensor 5 is disposed to output a value corresponding to the temperature of the vicinity of the rotational position sensor 8, as the temperature information. Specifically, the temperature sensor 5 is disposed at the vicinity of the rotational position sensor 8. For example, in the case where the rotational position sensor 8 is disposed on a circuit board of the motor 7, the temperature sensor 5 is mounted near the circuit board. The rotational position sensor 8 is, for example, a Hall sensor as described above, and has the property such that the magnitude of the signal to be output varies depending on temperature. That is, the temperature sensor 5 is disposed at a position allowing the estimation of the magnitude of the output signal of the rotational position sensor 8.

The temperature sensor 5 may not constitute the motor drive control device 1. Even in this case, it is only necessary that the output value of the temperature sensor 5 is input to the control unit 3 or the like of the motor drive control device 1 and the control unit 3 is configured to detect the temperature of the motor 7 based on the output value to be input.

To the control unit 3, the rotation output signal is input. The control unit 3 includes a rotational frequency detection unit 33 (shown in FIG. 2) to detect the true rotational frequency (true rotational frequency may be referred to as actual rotational frequency) of the motor 7 based on the rotation output signal. That is, the control unit 3 detects the rotational frequency of the motor 7 based on the output of the rotational position sensor 8 provided in the motor 7. To the control unit 3, the rotation signal output from the rotational position sensor 8 may be input, or an FG signal from an FG sensor provided in the motor 7 may be input. In this case, the control unit 3 may detect the rotational frequency of the motor 7 based on the input signal.

The control unit 3 outputs a signal indicating the rotational frequency of the motor 7, to the host device 9. Further, the control unit 3 outputs a signal corresponding to the driving state of the motor 7, to the host device 9. In the host device 9, based on these signals, it is possible to output various commands relevant to the drive of the motor 7, as exemplified by the rotational speed command, to the motor drive control device 1. These signals may not be output from the control unit 3. For example, the rotation signal from the rotational position sensor 8 or the rotation output signal from the pre-driver 22 may be input directly to the host device 9.

Figure 2:
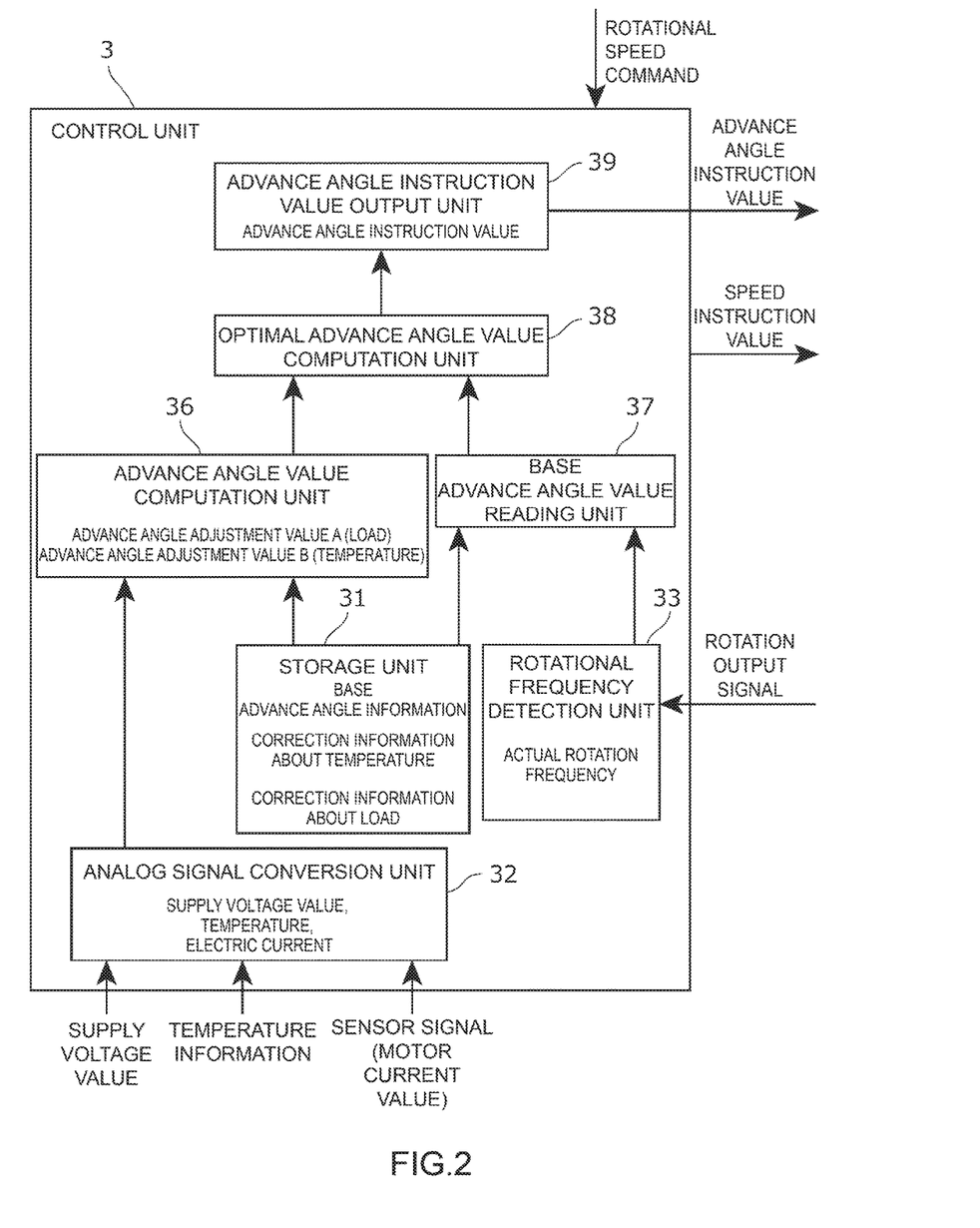
FIG. 2 is a diagram showing a configuration of a control unit according to the first embodiment.

FIG. 2 is a diagram showing a configuration of the control unit 3 according to the first embodiment.

As shown in FIG. 2, the control unit 3 includes a storage unit 31, an analog signal conversion unit 32 (an example of the supply voltage detection unit, an example of the temperature detection unit, an example of the electric current detection unit), the rotational frequency detection unit 33, an advance angle value computation unit 36 (an example of the load calculation unit), a base advance angle value reading unit 37, an optimal advance angle value computation unit 38, and an advance angle instruction value output unit 39 (an example of the advance angle instruction unit). For example, the control unit 3 is a microcomputer. Instead of a microcomputer having a complex configuration, the control unit 3 can be configured by using an inexpensive IC having a relatively simple configuration. The control unit 3 outputs the speed instruction value to the motor drive unit 2 based on the rotational speed command to be input from the host device 9.

For example, the storage unit 31 is flash memory. The storage unit 31 stores base advance angle information, first correction information as correction information about load, and second correction information as correction information about temperature.

The base advance angle information is information previously set to correspond to the rotational frequency of the motor 7. For example, the base advance angle information is a look-up table and in the look-up table the rotational frequency of the motor 7 and the base advance angle value corresponding to the rotational frequency are associated.

The first correction information is previously set to correspond to the magnitude of the load of the motor 7. For example, the first correction information is a look-up table and in the look-up table the value of the load (the value of the driving electric power) and a first advance angle adjustment value (the first advance angle adjustment value may be referred to as an advance angle adjustment value A) corresponding to the value of the load are associated.

The second correction information is previously set to correspond to the temperature of the motor 7. For example, the second correction information is a look-up table and in the look-up table the value of the temperature and a second advance angle adjustment value (the second advance angle adjustment value may be referred to as an advance angle adjustment value B) corresponding to the value of the temperature are associated.

For example, the base advance angle information, the first correction information and the second correction information may be stored as a calculation formula for calculating the base advance angle value and the advance angle adjustment values based on the values of the rotational frequency, the temperature and the driving electric power.

The analog signal conversion unit 32 performs the A/D conversion of the supply voltage value input to the control unit 3. Then, the analog signal conversion unit 32 outputs detection information of the supply voltage value converted into a digital signal, to the advance angle value computation unit 36.

Further, the analog signal conversion unit 32 performs the A/D conversion of the motor current value input to the control unit 3. Then, the analog signal conversion unit 32 outputs detection information of the motor current value converted into a digital signal to the advance angle value computation unit 36. That is, the analog signal conversion unit 32 functions as an electric current detection unit to detect the magnitude of an electric current flowing through the coil of the motor 7, and outputs the detection result to the advance angle value computation unit 36.

Further, the analog signal conversion unit 32 performs the A/D conversion of the temperature information about the temperature of the motor 7 input to the control unit 3. Then, the analog signal conversion unit 32 outputs detection information of the temperature information converted into a digital signal, to the advance angle value computation unit 36. That is, the analog signal conversion unit 32 functions as a temperature detection unit to detect the internal temperature of the motor 7, and outputs the detection result to the advance angle value computation unit 36.

The rotational frequency detection unit 33 detects the rotational frequency of the motor 7 based on the rotation output signal output from the pre-driver 22 of the motor drive unit 2, and outputs the detection result (actual rotational frequency information) to the base advance angle value reading unit 37.

The advance angle value computation unit 36 calculates the driving electric power of the motor 7 (an example of the load of the motor 7), based on the detection information of the supply voltage value and the detection information of the motor current value output from the analog signal conversion unit 32. That is, the advance angle value computation unit 36 functions as a load calculation unit to calculate the driving electric power of the motor 7 based on the detection result of the supply voltage detection unit and the detection result of the electric current detection unit output from the analog signal conversion unit 32. The advance angle value computation unit 36 judges the load state of the motor 7.

The advance angle value computation unit 36 compares the calculated driving electric power of the motor 7 with the first correction information stored in the storage unit 31, and determines the first advance angle adjustment value corresponding to the driving electric power. That is, the advance angle value computation unit 36 determines the first advance angle adjustment value corresponding to the calculated driving electric power (load) of the motor 7 based on the first correction information. The first advance angle adjustment value is the advance angle adjustment value A relevant to the load.

Further, the advance angle value computation unit 36 determines the second advance angle adjustment value based on the detection information of the temperature information output from the analog signal conversion unit 32 and the second correction information stored in the storage unit 31. That is, the advance angle value computation unit 36 determines the second advance angle adjustment value corresponding to the detection information of the temperature information corresponding to the temperature of the motor 7 output from the analog signal conversion unit 32 (temperature detection unit), based on the second correction information. The second advance angle adjustment value is the advance angle adjustment value B relevant to the temperature.

The advance angle value computation unit 36 outputs the determined advance angle adjustment value A (first advance angle adjustment value) and the advance angle adjustment value B (second advance angle adjustment value), to the optimal advance angle value computation unit 38.

The base advance angle value reading unit 37 reads the base advance angle value corresponding to the rotational frequency from the storage unit 31 based on the rotational frequency information output from the rotational frequency detection unit 33. That is, the base advance angle value reading unit 37 determines the base advance angle value corresponding to the detection result of the rotational frequency detection unit 33 based on the base advance angle information in the storage unit 31. The base advance angle value reading unit 37 outputs base advance angle value information to the optimal advance angle value computation unit 38.

The optimal advance angle value computation unit 38 adds the advance angle adjustment value A (first advance angle adjustment value) and advance angle adjustment value B (second advance angle adjustment value) input from the advance angle value computation unit 36 into the base advance angle value input from the base advance angle value reading unit 37, calculates an optimal advance angle value, and outputs the optimal advance angle value to the advance angle instruction value output unit 39. The advance angle instruction value output unit 39 sets the advance angle instruction value based on the optimal advance angle value, and outputs the set advance angle instruction value to the motor drive unit 2.

Figure 3:
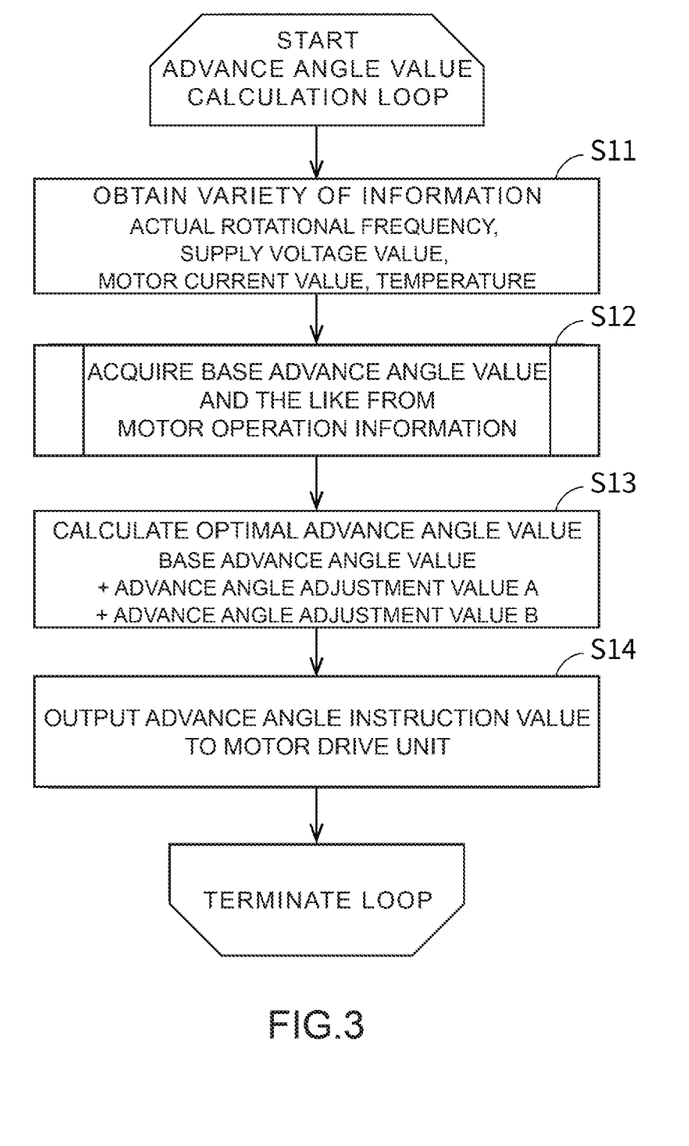
FIG. 3 is a flowchart showing an operation of the control unit.

FIG. 3 is a flowchart showing an operation of the control unit 3.

In FIG. 3, only a flow of processes of step S11 to step S14 about the setting of the advance angle instruction value that is performed in the control unit 3 is shown. The control unit 3 performs the setting of the advance angle instruction value (the calculation of the advance angle value) as follows, with each unit of the above-described storage unit 31, the analog signal conversion unit 32, the rotational frequency detection unit 33, the advance angle value computation unit 36, the base advance angle value reading unit 37, the optimal advance angle value computation unit 38 and the advance angle instruction value output unit 39. The processes shown in FIG. 3 are performed constantly and repeatedly while the motor drive control device 1 is operating.

In step S11, the control unit 3 detects and obtains a variety of information to be used for the setting of the advance angle instruction value (the variety of information may be referred to as motor operation information). That is, the control unit 3 detects the actual rotational frequency of the motor 7, the supply voltage value, the motor current value and the internal temperature of the motor 7. By the analog signal conversion unit 32, the supply voltage value, the motor current value and the internal temperature of the motor 7 are detected (supply voltage detection step, temperature detection step). Further, by the rotational frequency detection unit 33, the actual rotational frequency is detected (rotational frequency detection step).

In step S12, the control unit 3 performs a process of determining the base advance angle value and the like from the motor operation information. That is, as described above, the control unit 3 performs a process of determining the base advance angle value, the advance angle adjustment value A (first advance angle adjustment value) and the advance angle adjustment value B (second advance angle adjustment value), based on the detected motor operation information. Specifically, the base advance angle value is determined by the base advance angle value reading unit 37. Further, the advance angle adjustment value A and the advance angle adjustment value B are determined by the advance angle value computation unit 36.

In step S13, the optimal advance angle value computation unit 38 of the control unit 3 calculates the optimal advance angle value. The optimal advance angle value computation unit 38 adds the advance angle adjustment value A and advance angle adjustment value B input from the advance angle value computation unit 36 into the base advance angle value input from the base advance angle value reading unit 37 and calculates the optimal advance angle value.

In step S14, the advance angle instruction value output unit 39 of the control unit 3 sets the optimal advance angle value as the advance angle instruction value (advance angle instruction step). Then, the advance angle instruction value output unit 39 outputs the advance angle instruction value to the motor drive unit 2.

Figure 4:
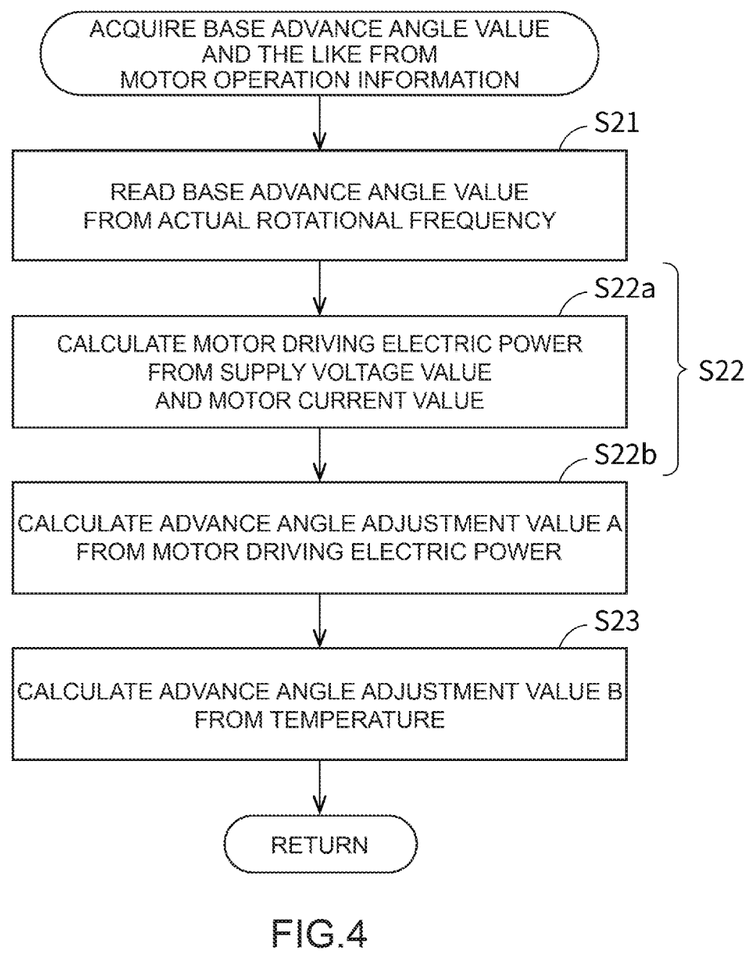
FIG. 4 is a flowchart showing a process of determining a base advance angle value and the like from motor operation information.

FIG. 4 is a flowchart showing a process of determining the base advance angle value and the like from the motor operation information.

As shown in FIG. 4, in step S21, the base advance angle value reading unit 37 reads the base advance angle value corresponding to the actual rotational frequency based on the base advance angle information in the storage unit 31.

In step S22, first, the advance angle value computation unit 36 calculates the driving electric power of the motor 7 from the supply voltage value and motor current value input from the analog signal conversion unit 32 (step S22a). Second, the advance angle value computation unit 36 refers to the first correction information based on the obtained driving electric power of the motor 7, and determines the advance angle adjustment value A (first advance angle adjustment value).

In step S23, the advance angle value computation unit 36 refers to the second correction information based on the detection information of the temperature information of the internal temperature of the motor 7 input from the analog signal conversion unit 32, and determines the advance angle adjustment value B (second advance angle adjustment value).

After the base advance angle value, the advance angle adjustment value A (first advance angle adjustment value) and the advance angle adjustment value B (second advance angle adjustment value) are input to the optimal advance angle value computation unit 38, the control unit 3 returns to the process in FIG. 3.

The process of step S21, the process of step S22 (step S22a and step S22b) and the process of step S23 are not limited to the illustrated order. The processes may be performed in a different order from this order, or may be performed in parallel.

Thus, in the first embodiment, the control unit 3 detects the internal temperature of the motor 7, the driving electric power of the motor 7, and the rotational frequency of the motor 7. Then, the control unit 3 sets the advance angle instruction value based on the respective detection results.

Figure 5:
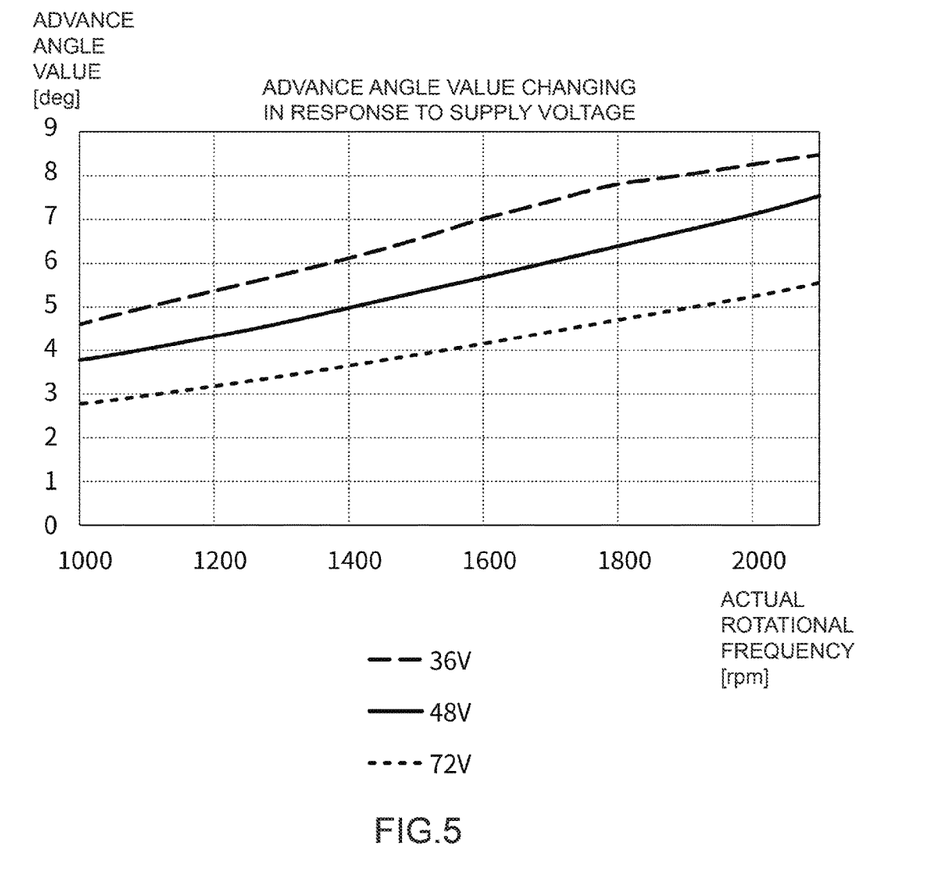
FIG. 5 is a graph showing relations between a rotational frequency and an advance angle value in a conventional motor drive control device.

FIG. 5 is a graph showing relations between the rotational frequency and the advance angle value in a conventional motor drive control device.

In FIG. 5, as an example, the advance angle value to be used in the conventional motor drive control device 801 shown in FIG. 10 is shown. In the graph, relations between the actual rotational frequency and advance angle value in three cases different in the supply voltage, for example, in the case where the supply voltage is 36 volts, 48 volts and 72 volts are shown.

As shown in FIG. 5, when the supply voltage increases, the advance angle value decreases, and the advance angle value is sometimes insufficient for putting the motor 7 into an optimal driving state. That is, when the voltage range allowing the operation of the motor 7 is widened (for example, to a range from 36 volts to 72 volts), depending on the specification of a control IC to be used, the advance angle value changes in response to the supply voltage, and the efficiency decreases. That is, in this case, the pre-driver performs an advance angle adjustment corresponding to the speed instruction value to be input. The speed instruction value sets an on-duty of a PWM signal to be output from the pre-driver. In the case where the control unit controls the motor such that the motor operates at a certain rotational frequency, when the supply voltage rises, such a control that the speed instruction value decreases is performed to realize the same rotational frequency. Thereby, the advance angle value set based on the speed instruction value changes.

Further, when the internal temperature of the motor 7 rapidly changes, the magnitude (amplitude) of the output signal of the rotational position sensor 8 (for example, a Hall sensor 8) sometimes fluctuates. When the internal temperature of the motor 7 increases, the magnitude of the output signal of the sensor 8 decreases, and sometimes, it is not possible to properly detect the rotational position of the motor 7.

On the other hand, in the first embodiment, the control unit 3, as described above, detects the supply voltage and the internal temperature of the motor 7, and sets the advance angle instruction value based on the detected supply voltage value and temperature information. More specifically, when at least one of the detected temperature of the motor 7 and the driving electric power of the motor 7 rises, the advance angle instruction value is set such that the advance angle increases in response to the rise. Thereby, it is possible to prevent the advance angle from becoming insufficient, when the temperature of the motor 7 increases so that the magnitude of the output signal of the rotational position sensor 8 decreases, or when the load of the motor 7 increases.

Figure 6:
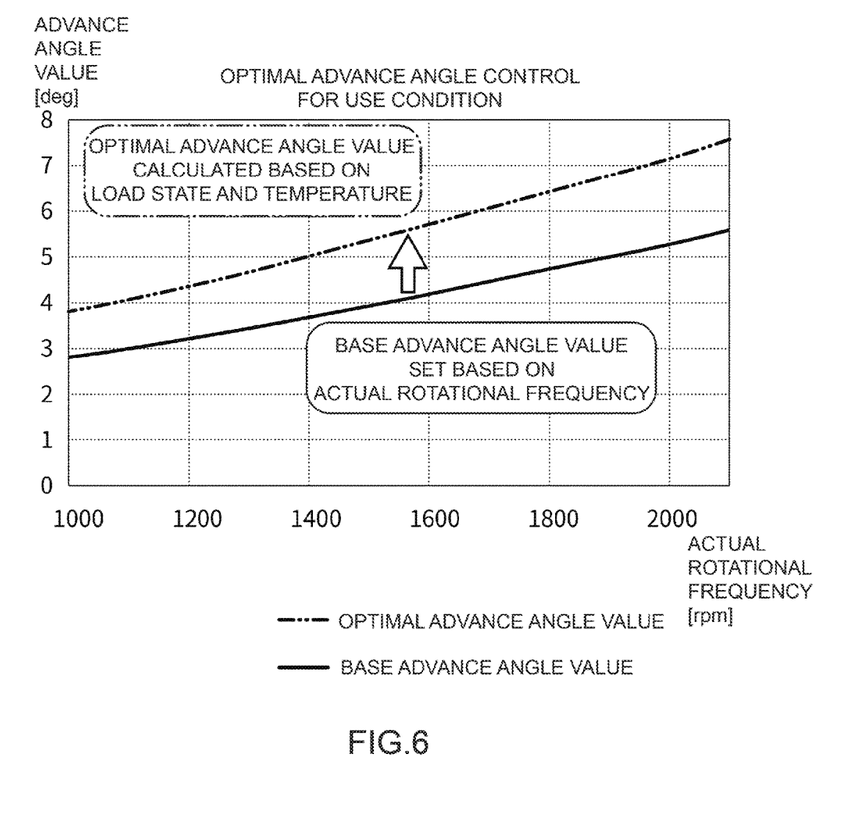
FIG. 6 is a graph for describing a control concept of a setting operation for an advance angle instruction value to be performed by the control unit.

FIG. 6 is a graph for describing a control concept of a setting operation for an advance angle instruction value to be performed by the control unit 3.

In the graph of FIG. 6, similarly to the graph shown in FIG. 5, relations between the rotational frequency and the advance angle value are shown. The solid line is a curve showing an example of the base advance angle value to be determined corresponding to the actual rotational frequency. The two-dot chain line is a curve showing an example of the optimal advance angle value resulting from adding the first advance angle adjustment value and the second advance angle adjustment value to the base advance angle value. As shown in the figure, when the control by the control unit 3 is performed so that the advance angle adjustment values calculated corresponding to the load state and temperature of the motor 7 are added, the magnitude of the optimal advance angle value increases compared to the advance angle value (base advance angle value) to be determined by only the rotational frequency. Accordingly, the advance angle value avoids becoming insufficient by the influence of the load state or the temperature of the motor 7.

As described above, in the first embodiment, it is possible to perform an appropriate advance angle adjustment corresponding to the rotational frequency in a wide operating voltage range. As a result, even when the electric power changes (increases or decreases), it is possible to operate the motor drive control device 1 at a high efficiency.

Further, in consideration of the change in the ambient temperature of the motor 7, the second advance angle adjustment value is calculated, and the setting of the advance angle instruction value is performed. Thereby, even when the internal temperature of the motor 7 changes or even under a low-temperature environment or a high-temperature environment, it is possible to stably operate the motor 7.

The setting of the advance angle instruction value can be performed, by only a simple microcomputer constituted by low-cost components such as the temperature sensor 5, and the control unit 3, without using a specific detection circuit. Accordingly, it is possible to reduce the production cost of the motor drive control device 1.

Second Embodiment

The basic configuration of a motor drive control device in a second embodiment is the same as that in the first embodiment, and therefore, the description is not repeated here. In the second embodiment, identical reference numerals are assigned to similar components to those in the first embodiment, and different components from those in the first embodiment are mainly described.

Figure 7:
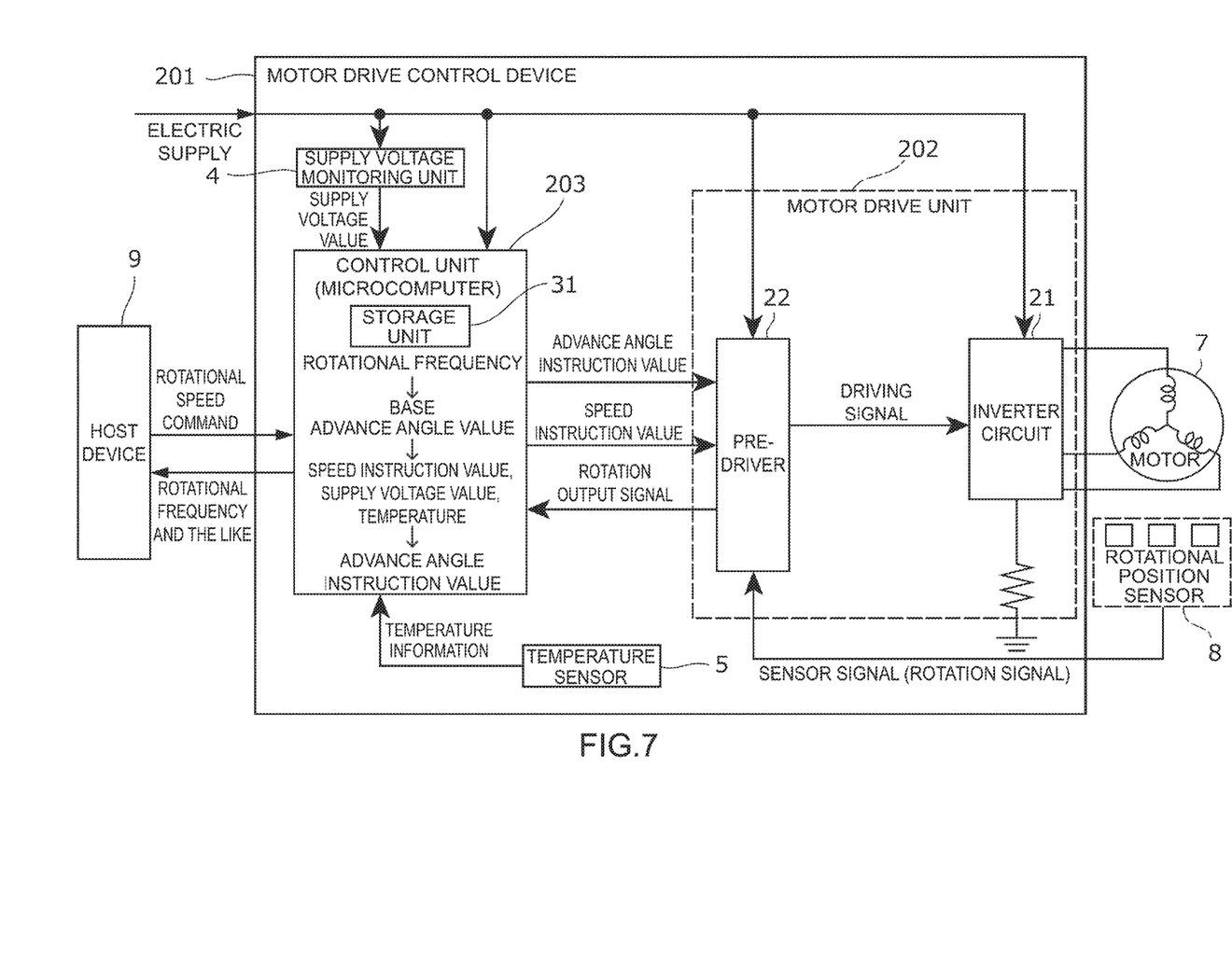
FIG. 7 is a block diagram showing an outline of a circuit configuration of a motor drive control device in a second embodiment of the present disclosure.

FIG. 7 is a block diagram showing an outline of a circuit configuration of a motor drive control device 201 in the second embodiment of the present disclosure.

As shown in FIG. 7, the motor drive control device 201 includes a motor drive unit 202 and a control unit 203.

In the second embodiment, the motor drive unit 202 includes the inverter circuit 21 and the pre-driver 22. In the motor drive unit 202, the motor current value from the inverter circuit 21 side is not input to the pre-driver 22. Further, the motor current value is not input to the control unit 203.

The control unit 203 detects the internal temperature of the motor 7, the supply voltage value, and the rotational frequency of the motor 7. Then, the control unit 203 performs an advance angle adjustment based on the internal temperature of the motor 7, the supply voltage, the rotational frequency of the motor 7, and the load state of the motor 7 estimated based on the speed instruction value.

Figure 8:
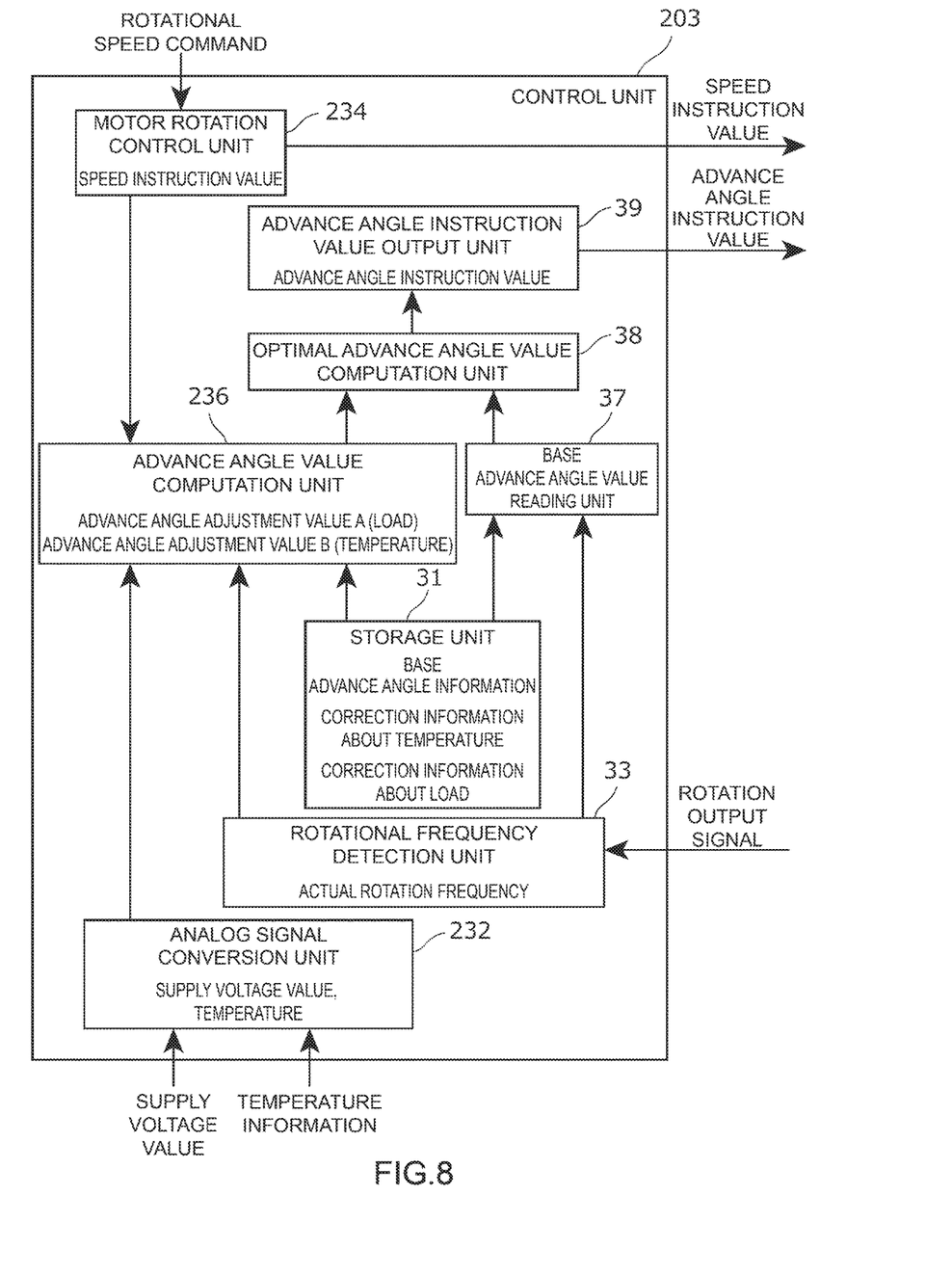
FIG. 8 is a diagram showing a configuration of a control unit according to the second embodiment.

FIG. 8 is a diagram showing a configuration of the control unit 203 according to the second embodiment.

As shown in FIG. 8, the control unit 203 includes the storage unit 31, an analog signal conversion unit 232, the rotational frequency detection unit 33, a motor rotation control unit 234, an advance angle value computation unit 236, the base advance angle value reading unit 37, the optimal advance angle value computation unit 38, and the advance angle instruction value output unit 39. That is, the control unit 203 is different from the control unit 3 according to the above-described first embodiment, in that the motor rotation control unit 234, the advance angle value computation unit 236 and the analog signal conversion unit 232 are provided and in that the advance angle value computation unit 236 and the analog signal conversion unit 232 perform slightly different operations from the operations of the advance angle value computation unit 36 and the analog signal conversion unit 32. Unlike the control unit 3, to the control unit 203, the motor current value is not input, however the rotational speed command, the rotation output signal, the supply voltage value and the temperature information are input.

In the second embodiment, the control unit 203 calculates the driving electric power of the motor 7, as the load state of the motor 7, based on the supply voltage value and control information relevant to the rotational frequency of the motor (hereinafter, the calculated driving electric power may be referred to as an estimated driving electric power).

The analog signal conversion unit 232 performs the A/D conversion of the supply voltage value input to the control unit 203 and the A/D conversion of the temperature information input to the control unit 203. Then, the analog signal conversion unit 232 outputs detection information of the supply voltage value converted into a digital signal and detection information of the temperature information converted into a digital signal, to the advance angle value computation unit 236. That is, the analog signal conversion unit 232 functions as a supply voltage detection unit to detect the supply voltage, and outputs the detection result (the detection information of the supply voltage value), to the advance angle value computation unit 236. Further, the analog signal conversion unit 232 functions as a temperature detection unit to detect the internal temperature of the motor 7, and outputs the detection result (the detection information of the temperature information), to the advance angle value computation unit 236.

The motor rotation control unit 234 outputs the speed instruction value in response to the rotational speed command. The speed instruction value is output to the motor drive unit 202. In the second embodiment, the speed instruction value is also output to the advance angle value computation unit 236.

The detection information of the supply voltage value and the detection information of the temperature information output from the analog signal conversion unit 232, and the speed instruction value output from the motor rotation control unit 234 are input to the advance angle value computation unit 236. Further, the rotational frequency information output from the rotational frequency detection unit 33 is input to the advance angle value computation unit 236.

The advance angle value computation unit 236 calculates the estimated driving electric power of the motor 7 based on the supply voltage value, the rotational frequency information (actual rotational frequency) and the speed instruction value. The detail is shown as follows. That is, the speed instruction value is a value for setting the on-time of the switch of the inverter circuit 21, and therefore, has a correlation with the driving electric power of the motor 7. Therefore, by performing calculation using the speed instruction value with the rotational frequency information and the supply voltage value, it is possible to estimate the driving electric power. For example, the advance angle value computation unit 236 calculates a multiplied value of the supply voltage value by the speed instruction value, compares the multiplied value with the actual rotational frequency and calculates the estimated driving electric power of the motor 7. For example, in the case where the actual rotational frequency of the motor 7 is low with respect to the speed instruction value, it is estimated that the load of the motor 7 is high, and it can be estimated that the driving electric power is high.

After calculating the estimated driving electric power, the advance angle value computation unit 236 compares the estimated driving electric power with the first correction information corresponding to the magnitude of the load stored in the storage unit 31 and determines the advance angle adjustment value A (first advance angle adjustment value). That is, the advance angle value computation unit 236 determines the advance angle adjustment value A (first advance angle adjustment value) corresponding to the estimated driving electric power of the motor 7 calculated by the load calculation unit based on the first correction information.

The advance angle value computation unit 236 outputs the acquired advance angle adjustment value A (first advance angle adjustment value) and the advance angle adjustment value B (second advance angle adjustment value) acquired in a similar way to the first embodiment, to the optimal advance angle value computation unit 38.

The optimal advance angle value computation unit 38 adds the advance angle adjustment value A (first advance angle adjustment value) and the advance angle adjustment value B (second advance angle adjustment value) to the base advance angle value input from the base advance angle value reading unit 37, calculates the optimal advance angle value and outputs the optimal advance angle value to the advance angle instruction value output unit 39. The advance angle instruction value output unit 39 sets the advance angle instruction value based on the optimal advance angle value, and outputs the set advance angle instruction value to the motor drive unit 202.

In this way, the advance angle instruction value output unit 39 of the control unit 203 can set the advance angle instruction value based on the detection value of the temperature information, the detection result of the rotational frequency detection unit 33, and the estimated driving electric power of the motor 7 calculated by the advance angle value computation unit 236.

In the case where at least one of the internal temperature and the estimated driving electric power of the motor 7 rises, the advance angle instruction value is set such that the advance angle increases.

Figure 9:
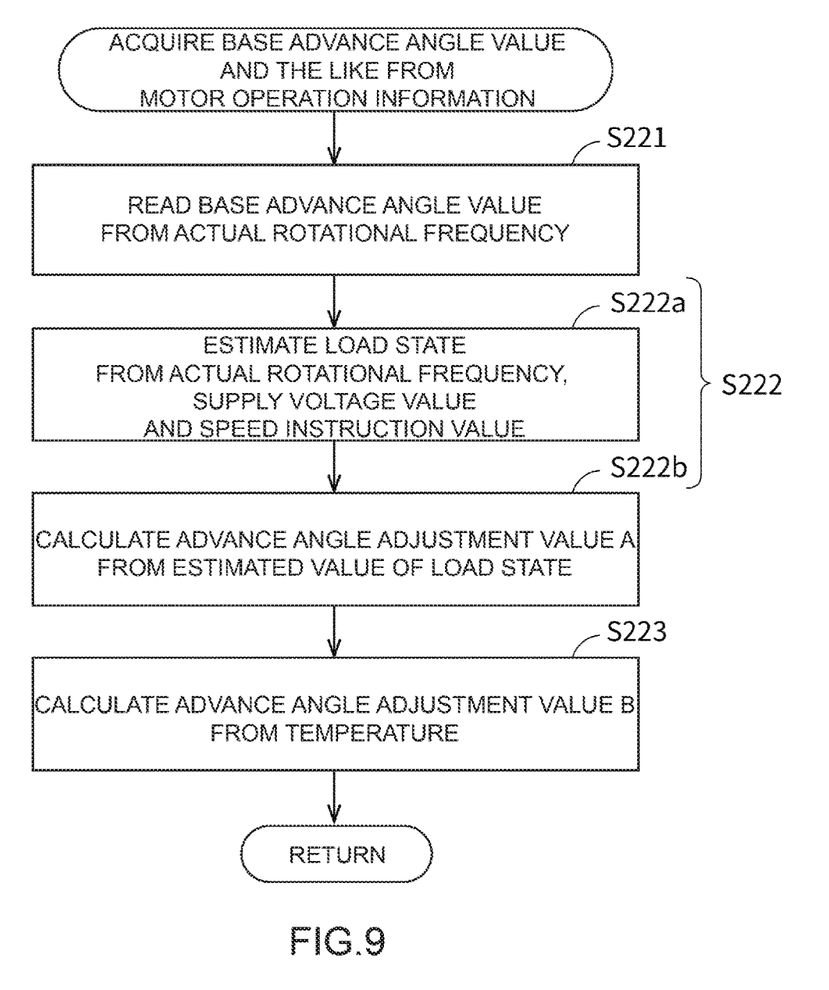
FIG. 9 is a flowchart showing a process of determining a base advance angle value and the like from motor operation information.

In the second embodiment, a process of determining the base advance angle value and the like from the motor operation information (in the second embodiment, the supply voltage value, the temperature information, the rotational frequency information, the speed instruction value and the like) is shown as follows.

FIG. 9 is a flowchart showing a process of determining the base advance angle value and the like from the motor operation information.

In FIG. 9, processes of step S221 and step S223 are similar to the processes in step S21 and step S23 according to the above-described first embodiment.

In the second embodiment, first, in step S222, the advance angle value computation unit 236 estimates the load state of the motor 7, from the actual rotational frequency, the supply voltage value and the speed instruction value (step S222a). That is, the advance angle value computation unit 236 estimates the driving electric power, from the actual rotational frequency, the supply voltage value and the speed instruction value. Then, based on the obtained estimated driving electric power of the motor 7, the advance angle value computation unit 236 refers to the first correction information, and determines the advance angle adjustment value A (first advance angle adjustment value) (step S222b).

Thus, in the second embodiment, the control unit 203 detects the internal temperature of the motor 7, the supply voltage, and the rotational frequency of the motor 7. Then, based on the supply voltage, the rotational frequency and the speed instruction value, the control unit 203 estimates the load state of the motor 7, and sets the advance angle instruction value. Accordingly, it is possible to obtain similar effects to the above-described first embodiment.

In the second embodiment, it is possible to estimate the load state and set the advance angle instruction value, without detecting the coil current of the motor 7, and therefore, it is possible to simplify the circuit configuration of the motor drive control device 201. Accordingly, it is possible to reduce the production cost of the motor drive control device 201.

Addition

The motor drive control device is not limited to circuit configurations shown in the above-described embodiments and modifications of the embodiments. Various circuit configurations configured in accordance with the object of the present disclosure can be applied.

The attaching position of the temperature sensor is not particularly limited. The temperature sensor may be incorporated in an IC containing the control unit, an IC containing the motor drive unit or the like. The type of the temperature sensor is not particularly limited.

The detection method for the rotational frequency of the motor is not particularly limited, and it is possible to use various methods such as a method of using a Hall sensor, a method of reading the FG signal of the pre-driver and a method of monitoring the counter electromotive force.

The driving technique for the motor is not limited to the normal sinusoidal-wave driving, and may be a driving technique with a rectangular wave, a driving technique with a trapezoidal wave, a driving technique with a specially modulated sinusoidal wave, or the like.

The motor current is not limited to the motor driving current of the inverter circuit, and may be a phase current.

The above-described flowchart or the like is an example shown for describing the operation, and the present disclosure is not limited to this example. The steps shown in the blocks in the flowchart are specific examples, and the present disclosure is not limited to this flowchart. For example, the order of the steps may be changed, another process may be inserted between steps, or processes may parallelized.

The motor to be driven by the motor drive control device in the present embodiment is not limited to the brushless motor having three phases, and may be a brushless motor having another number of phases. Also, the type of the motor is not particularly limited.

Some or all of the processes in the above-described embodiments may be performed by software, or may be performed by using a hardware circuit. For example, the control unit is not limited to a microcomputer. At least a part of the internal configurations of the control unit may be processed by software.

It should be understood that the above embodiments are examples and are not limitative in all respects. The scope of the present disclosure is intended to be defined not by the above description but by the claims, and to include all modifications in meanings and scopes equivalent to the claims.

What is claimed is:

1. A motor drive control device comprising:
    a temperature detection unit to detect a temperature of a motor;
    a rotational frequency detection unit to detect a rotational frequency of the motor based on an output of a rotational position sensor provided in the motor;
    a supply voltage detection unit to detect a supply voltage;
    a load calculation unit to calculate a magnitude of a load of the motor based on a detection result of the supply voltage detection unit;
    an advance angle instruction unit to set an advance angle instruction value based on a detection result of the temperature detection unit, a detection result of the rotational frequency detection unit and a calculation result of the load calculation unit; and
    a motor drive unit to supply a driving electric power to the motor based on a speed instruction value relevant to a rotational speed of the motor and the advance angle instruction value set by the advance angle instruction unit.

2. The motor drive control device according to claim 1, further comprising an electric current detection unit to detect a magnitude of an electric current flowing through a coil of the motor, wherein
    the load calculation unit calculates the driving electric power of the motor based on the detection result of the supply voltage detection unit and a detection result of the electric current detection unit, and
    the advance angle instruction unit sets the advance angle instruction value based on the detection result of the temperature detection unit, the detection result of the rotational frequency detection unit and the driving electric power of the motor calculated by the load calculation unit.

3. The motor drive control device according to claim 1, wherein
the load calculation unit calculates an estimated driving electric power of the motor based on the detection result of the supply voltage detection unit, the detection result of the rotational frequency detection unit and the speed instruction value, and
the advance angle instruction unit sets the advance angle instruction value based on the detection result of the temperature detection unit, the detection result of the rotational frequency detection unit and the estimated driving electric power of the motor calculated by the load calculation unit.

4. The motor drive control device according to claim 3, wherein
the load calculation unit calculates a multiplied value of a value of the supply voltage detected by the supply voltage detection unit by the speed instruction value, compares the multiplied value with the rotational frequency of the motor detected by the rotational frequency detection unit and calculates the estimated driving electric power of the motor.

5. The motor drive control device according to claim 1, wherein
the advance angle instruction unit sets the advance angle instruction value such that an advance angle increases in response to rising of at least one of the temperatures of the motor to be detected by the temperature detection unit and the load of the motor to be calculated by the load calculation unit.

6. The motor drive control device according to claim 1, wherein
the temperature detection unit detects an internal temperature of the motor based on a value output from a temperature sensor disposed inside of the motor, and
the temperature sensor is disposed to output a value corresponding to a temperature of a vicinity of the rotational position sensor.

7. The motor drive control device according to claim 1, further comprising a storage unit, wherein
the storage unit stores
base advance angle information previously set to correspond to the rotational frequency of the motor,
first correction information previously set to correspond to the magnitude of the load of the motor, and
second correction information previously set to correspond to the temperature of the motor, and
the advance angle instruction unit
determines a base advance angle value corresponding to the detection result of the rotational frequency detection unit based on the base advance angle information,
determines a first advance angle adjustment value corresponding to the calculation result of the load calculation unit based on the first correction information,
determines a second advance angle adjustment value corresponding to the detection result of the temperature detection unit based on the second correction information, and
sets the advance angle instruction value based on the base advance angle value, the first advance angle adjustment value and the second advance angle adjustment value.

8. A control method of a motor drive control device including a motor drive unit to supply a driving electric power to a motor, based on an advance angle instruction value and a speed instruction value relevant to a rotational speed of the motor,
the control method comprising:
a temperature detection step of detecting a temperature of the motor;
a rotational frequency detection step of detecting a rotational frequency of the motor based on an output of a rotational position sensor provided in the motor;
a supply voltage detection step of detecting a supply voltage;
a load calculation step of calculating a magnitude of a load of the motor based on a detection result in the supply voltage detection step; and
an advance angle instruction step of setting an advance angle instruction value based on a detection result in the temperature detection step, a detection result in the rotational frequency detection step and a calculation result in the load calculation step.

* * * * *